United States Patent [19]

Hunt

[11] Patent Number: 5,329,882

[45] Date of Patent: Jul. 19, 1994

[54] SMALL LIVESTOCK HEAD RESTRAINT DEVICE

[76] Inventor: Roy H. Hunt, 2361 10th St. West, Woodland Hills, Calif. 93560

[21] Appl. No.: 3,458

[22] Filed: Jan. 12, 1993

[51] Int. Cl.⁵ .............................................. A01K 15/04
[52] U.S. Cl. ...................................... 119/757; 269/909; 248/125; 248/219.3; 248/132; 248/414; 452/54
[58] Field of Search ................... 119/98, 97.1, 97.2, 119/103, 99, 96, 151, 722, 723, 724, 753, 754, 756, 757; 452/54, 187; 269/909; 248/125, 118, 218.4, 219.1, 219.3, 219.4, 70, 74.2, 151, 161, 132, 414

[56] References Cited

U.S. PATENT DOCUMENTS

| | | |
|---|---|---|
| 266,016 | 10/1882 | Cook . |
| 1,705,115 | 3/1929 | Hollestelle ........................ 119/103 |
| 2,319,938 | 5/1943 | Markins ............................ 119/97.1 |
| 2,945,660 | 7/1960 | Slavsky et al. ................... 248/161 |
| 3,137,273 | 6/1964 | Greenwood ...................... 119/103 |
| 3,262,666 | 7/1966 | Solum ............................... 248/414 |
| 3,483,846 | 12/1969 | Quint ................................ 119/98 |
| 3,635,199 | 1/1972 | Fortney . |
| 3,693,595 | 9/1972 | Stewart ............................. 119/97.2 |
| 3,717,128 | 2/1973 | Pearman et al. ................. 119/103 |
| 3,777,715 | 12/1973 | Hill et al. . |
| 4,186,690 | 2/1980 | Seiler . |
| 4,274,366 | 6/1981 | Adam ................................ 119/98 |
| 4,484,705 | 11/1984 | Sande ................................ 248/132 |
| 4,549,501 | 10/1985 | Anderson et al. . |
| 4,666,118 | 5/1987 | Busche ............................. 248/218.4 |
| 4,771,737 | 9/1988 | Lynch . |
| 4,942,846 | 7/1990 | Reinhold et al. . |

FOREIGN PATENT DOCUMENTS

| | | | |
|---|---|---|---|
| 18459 | 7/1935 | Australia .......................... | 119/103 |
| 43911 | 3/1971 | Finland ............................ | 119/103 |

*Primary Examiner*—Gene Mancene
*Assistant Examiner*—Todd E. Manahan
*Attorney, Agent, or Firm*—Kelly, Bauersfeld & Lowry

[57] ABSTRACT

A small livestock head restraint device is provided which can be temporarily secured to a fence for field use in securely capturing the head of a small animal. The small livestock head restraint device includes a vertical support member typically positioned adjacent to fence railings or a cylindrical pole, and a pair of clamps which can be tightened about the railings or pole to securely fix the support member to the fencing. A slider bracket is attached to the support member, and a mounting shaft, having fixed thereto a headrest arm and the animal headrest, is movable vertically within the slider bracket to adjust the height of the animal headrest after the device has been secured to the fencing. In one preferred form, a pair of rail clamps are adjustably fixed to the support member for engaging generally horizontal fence rails. In another preferred form, a pair of pole clamps are attached to the mounting shaft and pivot to grasp a generally vertical pole therebetween.

20 Claims, 2 Drawing Sheets

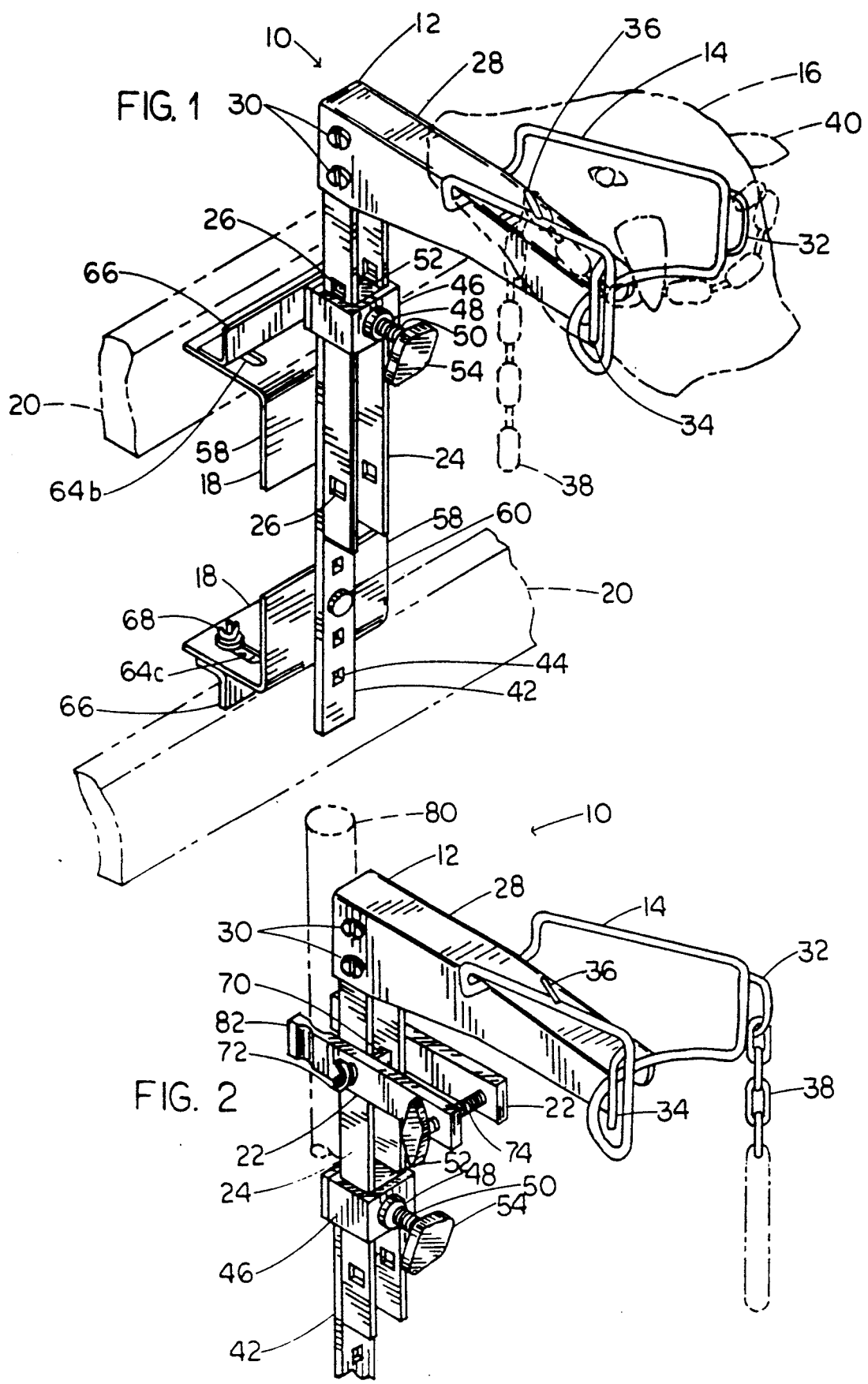

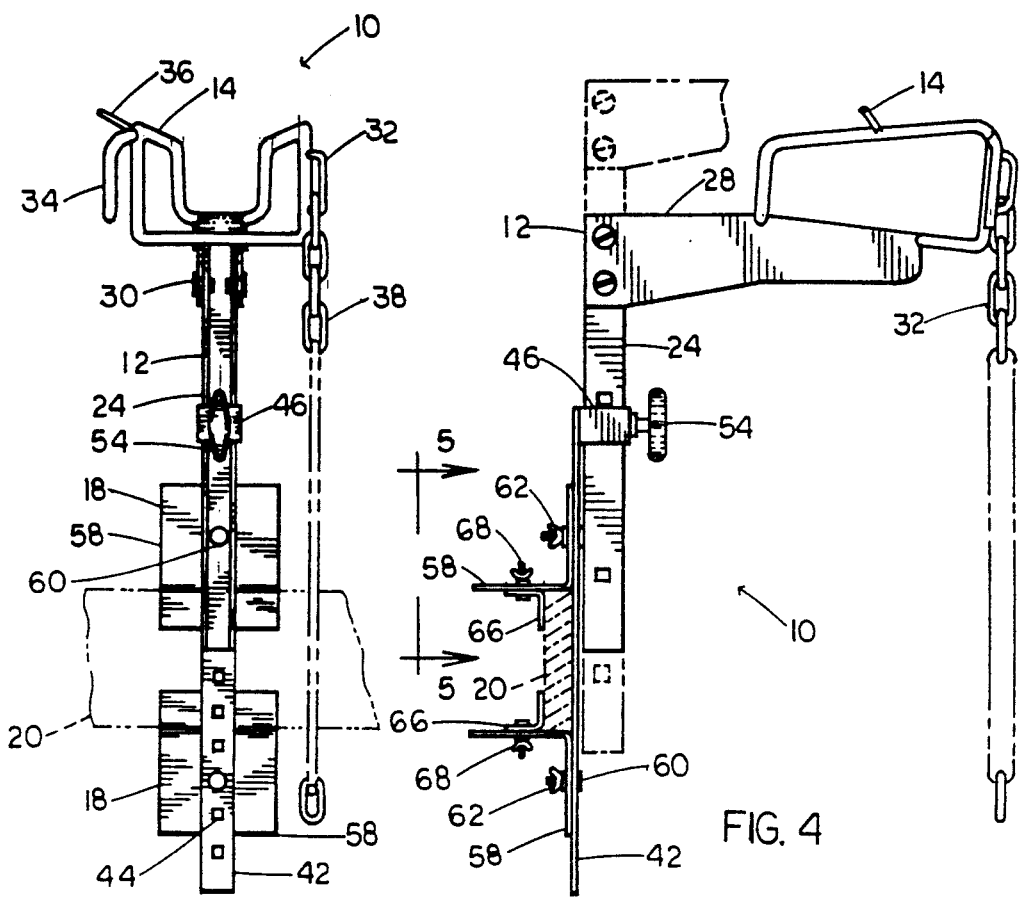
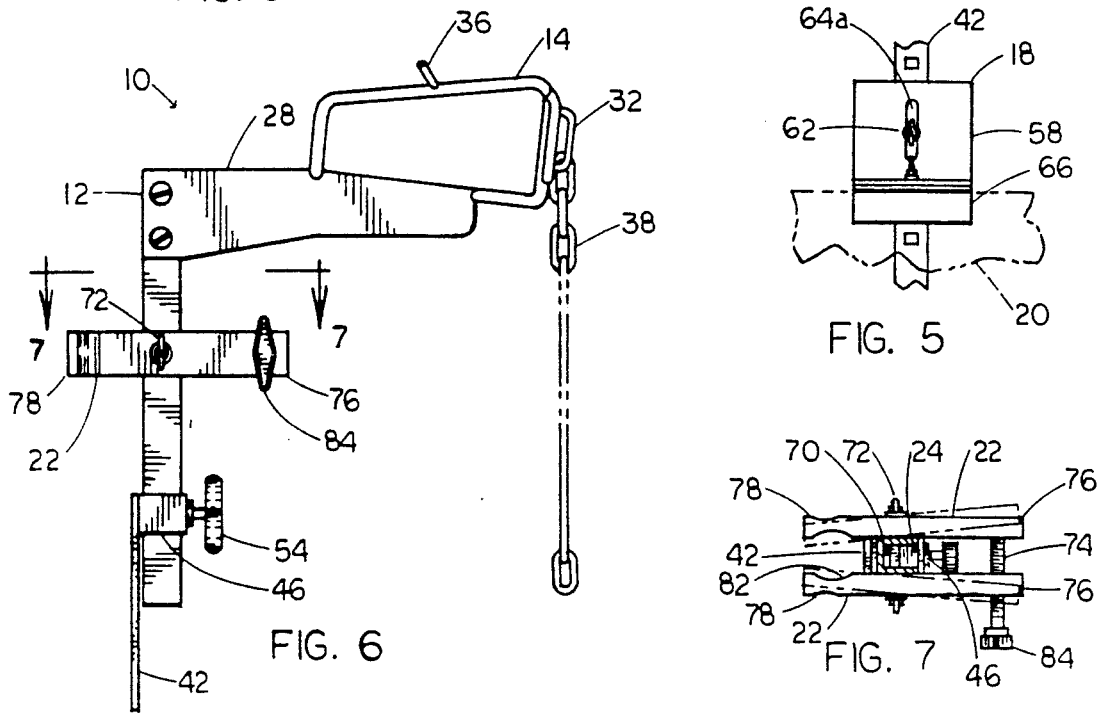

SMALL LIVESTOCK HEAD RESTRAINT DEVICE

BACKGROUND OF THE INVENTION

This invention relates generally to small livestock headcatches which are principally utilized when showing, grooming, shearing or inoculating an animal such as a sheep or a calf. More specifically, the present invention relates to a portable and adjustable head restraint device which may be attached to portions of standard livestock fencing.

Many prior devices have been devised for holding an animal in a desired position while showing, grooming, shearing or inoculating the animal. For example, as shown and explained in U.S. Pat. No. 4,186,690, in the grooming of animals such as show dogs, the animal is normally placed on a table having a top located several feet above the floor, to position the animal at a height convenient for performing the grooming operation. The animal is usually restrained on the table during the grooming by a tether connected to an arm rigidly supported by the table and extending to a point a short distance above the animal, and the tether is of such a length that it retains the animal in a sitting or at least in a partially upright position on the table. The tether is normally firmly attached to the arm at one end and has a noose at the other end which is placed over the animal's head and is tightened around the neck.

Another apparatus is known as a holddown device which is utilized primarily for holding an animal, such as a calf, on the ground during branding operations. Such a device is shown in U.S. Pat. No. 3,635,199. Still other devices such as the sheep-holding device of U.S. Pat. No. 266,016, provide rigid shackles for holding the sheep's neck and/or legs during shearing.

There are many different types of blocking stands which include a headcatch. The purpose of a traditional blocking stand is to securely hold the livestock in place on a platform above ground level, where it can be conveniently "worked". However, as recognized in U.S. Pat. No. 4,942,846, it is often necessary or convenient to perform a desired activity or treatment on an animal while it is in a field or pasture. Thus, portable headcatches have been designed which are capable of being mounted on a vehicle.

None of the prior shackles, tethers, blocking stands or portable headcatches, however, are truly portable to permit them to be hand-carried from one location to another and then set up adjacent to fencing typically found in the vicinity of the livestock. It is often not possible, particularly in a show environment, to rely on a portable headcatch mountable only to or in connection with a motor vehicle.

Accordingly, there has been a need for a novel small livestock head restraint device which may be hand-carried from one location to another, and secured adjacent to typical rail and chain link livestock fencing systems. Such a head restraint device should be of simplified construction in order to minimize the cost thereof, be rugged enough to withstand the abuse and wear expected in connection with routine use with livestock, and perform its intended function well. Additionally, a small livestock head restraint device is needed which can adjustably position the height of the headrest once the device is securely fixed to the fencing. The present invention fulfills these needs and provides other related advantages.

SUMMARY OF THE INVENTION

The present invention resides in an improved head restraint device for small livestock which is temporarily positionable adjacent to a portion of a fence. The head restraint device comprises, generally, a headrest support assembly, a headrest fixed to the support assembly and adapted to support and securely hold the head of an animal, and adjustable clamping means for temporarily securing the headrest support assembly to a fence. The headrest support assembly includes a mounting shaft positioned adjacent to the fence, and a headrest arm fixed to one end of the mounting shaft and which extends away from the fence. A chain may be fixed to the headrest and utilized to hold the head of the animal.

In a preferred form of the invention, a vertical support member which is positioned adjacent to the fence and attached to the adjustable clamping means. A slider bracket is fixed to the support member, and the mounting shaft is vertically movable within the slider bracket to permit adjustable positioning of the mounting shaft relative to the support member and the adjustable clamping means. Means are also provided for locking the mounting shaft in a selected position relative to the support member. The locking means include a height adjustment bolt extending through the slider bracket for frictionally engaging a portion of the mounting shaft.

In one configuration, the adjustable clamping means comprises a pair of rail clamps. The rail clamps are adjustably positionable relative to the headrest support assembly and are configured to engage one or two standard horizontal fence rails. Each of the rail clamps includes an adjustable bracket to accommodate fence rails of different widths. The rail clamps can be utilized to cooperatively engage a single horizontal fence rail or, alternatively, cooperatively engage adjacent horizontal fence rails to temporarily secure the headrest support assembly to the fence.

In another alternative configuration, the adjustable clamping means comprises a pair of pole clamps. Each pole clamp is attached to the headrest support assembly and pivots with respect thereto. A tension screw is utilized to force apart first ends of the pole clamps so that second ends thereof are pressed toward one another to clamp a pole therebetween. This alternative configuration is useful particularly in connection with chain link fences. Arch-shaped cutouts are provided in each of the pole clamps for accommodating the exterior configuration of the fence poles.

Other features and advantages of the present invention will become apparent from the following more detailed description, taken in conjunction with the accompanying drawings which illustrate, by way example, the principles of the invention.

BRIEF DESCRIPTION OF THE DRAWINGS

The accompanying drawings illustrate the invention. In such drawings:

FIG. 1 is a top, rear and left side perspective view of a small livestock head restraint device embodying the present invention, illustrating the manner in which a lambs head (shown in phantom) is secured within a headrest, and further showing the manner in which a pair of rail clamps engage two adjacent horizontal fence rails (also shown in phantom) to secure the head restraint device to the fence;

FIG. 2 is a top, rear and left side perspective view of another preferred form of the small livestock head restraint device embodying the present invention, illustrating the manner in which a pair of pole clamps are utilized to attach the head restraint device to a cylindrical fence pole;

FIG. 3 is a rear elevational view of the head restraint device shown in FIG. 1, wherein the rail clamps are each turned 180 degrees for clamping the head restraint device to a single fence rail;

FIG. 4 is a left side elevational view of the head restraint device shown in FIG. 3, wherein the phantom line representation of the headrest support assembly illustrates the manner in which a mounting shaft is adjustable relative to a support member;

FIG. 5 is a fragmented front elevational view of a portion of the head restraint device taken generally along the line 5—5 of FIG. 4;

FIG. 6 is a left side elevational view of the head restraint device shown in FIG. 2; and FIG. 7 is a sectional view taken generally along the lines 7—7 of FIG. 6, illustrating details of the pole clamps.

DETAILED DESCRIPTION OF THE PREFERRED EMBODIMENT

As shown in the drawings for purposes of illustration, the present invention is concerned with an improved small livestock head restraint device, generally designated by the reference number 10. The improved head restraint device 10 comprises, generally, a headrest support assembly 12, a headrest 14 fixed to the support assembly and adapted to support and securely hold the head 16 of an animal, and adjustable clamping means for temporarily securing the headrest support assembly to a fence. As illustrated in FIGS. 1 and 3-5, the adjustable clamping means comprises a pair of rail clamps 18 which are adjustably positionable relative to the headrest support assembly 12 and are configured to engage one or two standard horizontal fence rails 20. In an alternative configuration as shown in FIGS. 2, 6 and 7, the adjustable clamping means comprises a pair of pole clamps 22. This alternative configuration is useful particularly in connection with chain link fences.

In accordance with the present invention, the headrest support assembly 12 includes a generally vertical U-shaped mounting shaft 24 typically positioned adjacent to a portion of a fence. Pairs of aligned square apertures 26 are provided in the mounting shaft, and a headrest arm 28 is fixed to an upper end of the mounting shaft by means of bolts 30. The headrest arm 28 extends horizontally away from the mounting shaft and the adjacent fence to which the head restraint device 10 is attached. The headrest 14 is welded to the headrest arm 28, and includes a chain anchor 32 and two chain lock stubs 34 and 36. Thus, means are provided for supporting and securely holding a snout portion of a head of a standing animal.

A chain 38 is utilized in connection with the head restraint device 10 to hold the head 16 of the animal in place within the headrest 14. One end of the chain 38 is secured to the chain anchor 32. As shown in FIG. 1, when the animal's head 16 is properly placed within the headrest 14, the chain 38 is typically looped behind the head of the animal beneath it's ears 40 and secured to the first chain lock stub 34 and then, in turn, to the second chain lock stub 36. This particular manner of securing the head 16 of the animal within the headrest 14 is adequate under most circumstances. However, it is preferred that the chain 38 be of sufficient length to permit it to be looped about the snout of the animal, if desired, A vertical support member 42 is provided for attaching the headrest support assembly 12 to the adjustable clamping means. The vertical support member 42 comprises a flat bar having a plurality of square apertures 44 generally extending its length. A slider bracket 46 is fixed to an upper end of the support member 42, and the mounting shaft 24 is vertically movable within the slider bracket to permit adjustable positioning of the mounting shaft relative to the support member and to the adjustable clamping means. The slider bracket 46 has a aperture (not shown) through a rear face thereof, and a nut 48 secured generally over said aperture. A height adjustment bolt 50 is threaded through the nut 48 to support a locking plug 52 positioned within the slider bracket 46 and the U-shaped channel formed by the mounting shaft 24. A handle 54 is provided for turning the height adjustment bolt 50 to press the locking plug 52 into frictional engagement with the mounting shaft 24 within the slider bracket 46, to lock the mounting shaft in position relative to the vertical support member 42. This particular construction conveniently permits the headrest support assembly 12 to be vertically adjustably positioned relative to the vertical support member 42 after the head restraint device 10 has been secured to a fence by simply turning the handle 54 to loosen or tighten the locking plug 52 within the slider bracket 46.

With reference now specifically to FIGS. 1 and 3-5, the clamping means comprises a pair of rail clamps 18 which are adjustably positionable on the vertical support member 42 and configured to engage one or two standard horizontal fence rails 20. Each rail clamp 18 comprises a primary L-shaped bracket 58 which is secured to the vertical support member 42 with flat-head bolts 60. These bolts 60 have a square shaft that fits within the square apertures 44 of the support member 42, and a wing nut 62 is utilized to clamp the primary bracket 58 in place. The primary bracket 58 includes three elongated slots 64 a-c. The forwardly extending end of the flat-head bolts extend through a first of the elongated slots 64a, whereas the second and third elongated slots 64b and 64c are parallel to one another for supporting an adjustable secondary bracket 66. The secondary bracket 66 is secured to the primary bracket 58 utilizing nut and bolt combinations 68.

The first elongated slot 64a permits the primary bracket to be adjusted vertically with respect to the vertical support member 42. This is useful when placing the head restraint device 10 adjacent to a fence. The second and third elongated slots 64b and 64c are utilized to permit adjustable horizontal positioning of the secondary bracket 66 relative to the primary bracket 58. As illustrated in FIG. 1, the rail clamps 18 may be utilized to cooperatively engage adjacent horizontal fence rails 20 to temporarily secure the headrest support assembly 12 to the fence. The secondary brackets 66 are positioned so as to permit the fence rails 20 to be bracketed between the vertical support bar 42 and/or the headrest support assembly 12 and the secondary bracket 66, and the primary bracket 58 is adjusted such that each of the rail clamps 18 fully engages a respective one of the fence rails 20. Alternatively, as shown in FIG. 3-5, both of the rail clamps 18 may be utilized to cooperatively engage a single horizontal fence rail 20 by simply turning the rail clamps 180 degrees from the configuration shown if FIG. 1.

In an alternative configuration shown in FIGS. 2, 6 and 7, the adjustable clamping means comprises a pair of pole clamps 22. Each pole clamp 22 is attached to the headrest support assembly 12 and pivots with respect thereto. More specifically, a square-shaft bolt 70 extends through the square apertures 26 in the mounting shaft 24, and a pair of wing nuts 72 are utilized to secure the pole clamps 22 in place. A tension screw 74 is utilized to force apart first ends 76 of the pole clamps 22 so that second ends 78 thereof are pressed toward one another to clamp a pole 80 therebetween. The pivot point for the pole clamps 22 is at their connection to the mounting shaft 24 via the bolt 70. The second ends 78 are configured to include arch-shaped cutouts 82 designed to accommodate the exterior cylindrical configuration of the fence pole 80. The tension screw 74, which is provided a handle 84, is threaded through one of the pole clamps 22 and simply engages in an abutting relationship, an interior surface of a second one of the pole clamps, for pivoting the pole clamps 22 as shown in FIG. 7.

From the foregoing it is to be appreciated that the small livestock head restraint device 10 is sufficiently compact and lightweight to permit it to be hand-carried from one location to another and secured adjacent to typical rail and chain link livestock fencing systems. The head restraint device 10 may be adjusted, after it is secured to the fence, to selectably position the height of the headrest in a desired location.

Although two particular embodiments of the invention have been described in detail for purposes of illustration, various modifications of each may be made without departing from the spirit and scope of the invention. Accordingly, the invention is not to be limited, except as by the appended claims.

We claim:

1. A head restraint device for small livestock which is temporarily positionable adjacent to a fence, the head restraint device comprising:
   a headrest support assembly including a mounting shaft and a headrest arm fixed to one end of the mounting shaft and extending away therefrom;
   means for supporting and securely holding a snout portion of a head of a standing animal, including a headrest fixed to the headrest arm; and
   adjustable clamping means for temporarily securing the headrest support assembly to the fence.

2. A head restraint device as set forth in claim 1, wherein the holding means includes a chain fixed to the headrest, which is utilized to hold the head of the animal within the headrest.

3. A head restraint device as set forth in claim 1, wherein the headrest support assembly includes a support member attached to the adjustable clamping means, and a slider bracket fixed to the support member, wherein the mounting shaft is movable within the slider bracket to permit adjustable positioning of the mounting shaft relative to the support member and the adjustable clamping means.

4. A head restraint device as set forth in claim 3, including means for locking the mounting shaft in a selected position relative to the support member.

5. A head restraint device as set forth in claim 4, wherein the locking means includes a height adjustment bolt extending through the slider bracket, for frictionally engaging a portion of the mounting shaft therein.

6. A head restraint device as set forth in claim 1, wherein the adjustable clamping means comprises a vertical support member and a pair of rail clamps attached thereto, each rail clamp being configured to engage a fence rail.

7. A head restraint device as set forth in claim 6, wherein the rail clamps are vertically adjustably positionable relative to the vertical support member.

8. A head restraint device as set forth in claim 7, wherein each rail clamp includes an adjustable bracket horizontally adjustable relative to the rail clamp, to accommodate fence rails of different widths.

9. A head restraint device as set forth in claim 1, wherein the adjustable clamping means comprises a pair of pole clamps.

10. A head restraint device as set forth in claim 9, wherein each pole clamp is attached to the headrest support assembly and pivots with respect thereto, and wherein a tension screw is utilized to force apart first ends of the pole clamps so that second ends thereof are pressed toward one another to clamp a pole therebetween.

11. A head restraint device as set forth in claim 9, including arch-shaped cutouts provided in each of the pole clamps, for accommodating generally cylindrical fence poles.

12. A head restraint device for small livestock in combination with a fence, the head restraint device comprising:
   a vertical support member positioned adjacent to the fence;
   adjustable clamping means for temporarily securing the support member to the fence;
   a headrest support assembly vertically adjustably positionable with respect to the support member, the headrest support assembly including a generally vertical mounting shaft positioned adjacent to the support member, and a headrest arm fixed to one end of the mounting shaft and extending away from the support member; and
   means for supporting and securely holding a snout portion of a head of a standing animal, including a headrest fixed to the headrest arm.

13. A head restraint device as set forth in claim 12, including a slider bracket fixed to the support member, wherein the mounting shaft is movable within the slider bracket to permit adjustable positioning of the mounting shaft relative to the support member and the clamping means, and further including means for locking the mounting shaft in a selected position relative to the support member.

14. A head restraint device as set forth in claim 13, wherein the locking means includes a height adjustment bolt extending through the slider bracket, for frictionally engaging a portion of the mounting shaft therein.

15. A head restraint device as set forth in claim 12, wherein the holding means includes a chain fixed to the headrest, which is utilized to hold the head of the animal within the headrest.

16. A head restraint device as set forth in claim 12, wherein the adjustable clamping means comprises a vertical support member and a pair of rail clamps attached thereto, each rail clamp being configured to engage a fence rail, wherein the rail clamps are vertically adjustably positionable relative to the vertical support member.

17. A head restraint device as set forth in claim 16, wherein each rail clamp includes an adjustable bracket horizontally adjustable relative to the rail clamp, to accommodate fence rails of different widths.

18. A head restraint device as set forth in claim 12, wherein the adjustable clamping means comprises a pair of pole clamps, wherein each pole clamp is attached to the headrest support assembly and pivots with respect thereto, and wherein a tension screw is utilized to force apart first ends of the pole clamps so that second ends thereof are pressed toward one another to clamp a pole therebetween.

19. A head restraint device as set forth in claim 18, including arch-shaped cutouts provided in each of the pole clamps, for accommodating generally cylindrical fence poles.

20. A head restraint device for small livestock in combination with a fence, the head restraint device comprising:
 a vertical support member positioned adjacent to the fence;
 a headrest support assembly vertically adjustably positionable with respect to the support member, the headrest support assembly including a generally vertical mounting shaft positioned adjacent to the support member;
 a headrest arm fixed to one end of the mounting shaft;
 adjustable clamping means for temporarily securing the support member to the fence, the adjustable clamping means including a vertical support member and a pair of rail clamps attached thereto, each rail clamp engaging a fence rail of the fence and being vertically adjustably positionable relative to the vertical support member;
 a slider bracket fixed to the support member, wherein the mounting shaft is movable within the slider bracket to permit adjustable positioning of the mounting shaft relative to the support member and the adjustable clamping means;
 means for locking the mounting shaft in a selected position relative to the support member, the locking means including a height adjustment bolt extending through the slider bracket for frictionally engaging a portion of the mounting shaft therein; and
 means for supporting and securely holding a snout portion of a head of a standing animal, including a headrest fixed to the headrest arm.

* * * * *